(12) United States Patent
Lin et al.

(10) Patent No.: US 12,407,811 B2
(45) Date of Patent: *Sep. 2, 2025

(54) DNN-BASED CROSS COMPONENT PREDICTION

(71) Applicant: TENCENT AMERICA LLC, Palo Alto, CA (US)

(72) Inventors: Sheng Lin, San Jose, CA (US); Wei Jiang, Sunnyvale, CA (US); Wei Wang, Palo Alto, CA (US); Liqiang Wang, Palo Alto, CA (US); Shan Liu, San Jose, CA (US); Xiaozhong Xu, State College, PA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/413,713

(22) Filed: Jan. 16, 2024

(65) Prior Publication Data

US 2024/0155112 A1   May 9, 2024

Related U.S. Application Data

(63) Continuation of application No. 17/749,730, filed on May 20, 2022, now Pat. No. 11,909,956.
(Continued)

(51) Int. Cl.
*H04N 19/105* (2014.01)
*H04N 19/132* (2014.01)
(Continued)

(52) U.S. Cl.
CPC ......... *H04N 19/105* (2014.11); *H04N 19/132* (2014.11); *H04N 19/176* (2014.11); *H04N 19/186* (2014.11)

(58) Field of Classification Search
CPC .. H04N 19/105; H04N 19/132; H04N 19/176; H04N 19/186; H04N 19/46; H04N 19/50; H04N 19/59
(Continued)

(56) References Cited

U.S. PATENT DOCUMENTS

2017/0230656 A1   8/2017   Leontaris et al.
2020/0186809 A1   6/2020   Mukherjee et al.
(Continued)

FOREIGN PATENT DOCUMENTS

| CN | 110602491 A | 12/2019 |
|---|---|---|
| WO | 2020/264457 A1 | 12/2020 |
| WO | 2021/069688 A1 | 4/2021 |

OTHER PUBLICATIONS

Extended European Search Report issued Jul. 24, 2023 in European Application No. 22790194.9.
(Continued)

*Primary Examiner* — Marnie A Matt
(74) *Attorney, Agent, or Firm* — Sughrue Mion, PLLC

(57) ABSTRACT

Systems and methods for deep neural network (DNN)-based cross component prediction are provided. A method includes inputting a reconstructed luma block of an image or video into a DNN; and predicting, by the DNN, a reconstructed chroma block of the image or video based on the reconstructed luma block that is input. Luma and chroma reference information and side information may also be input into the DNN to predict the reconstructed chroma block. The various inputs may also be generated using processes such as downsampling and transformation.

20 Claims, 8 Drawing Sheets

Related U.S. Application Data

(60) Provisional application No. 63/210,741, filed on Jun. 15, 2021.

(51) Int. Cl.
*H04N 19/176* (2014.01)
*H04N 19/186* (2014.01)

(58) Field of Classification Search
USPC .................................................. 375/240.02
See application file for complete search history.

(56) References Cited

U.S. PATENT DOCUMENTS

| 2020/0304833 A1 | 9/2020 | Budagavi |
| 2023/0016377 A1 | 1/2023 | Zhu et al. |
| 2023/0336736 A1* | 10/2023 | Gao .................... H04N 19/172 |

OTHER PUBLICATIONS

Liqiang Wang, et al., "AHG11:neural network based cross-component prediction model", Joint Video Experts Team (JVET) of ITU-T SG16 WP 3 and ISO/IEC JTC 1/SC 29, JVET-W0111-v2, Jul. 7-16, 2021, 23rd Meeting, by teleconference (5 pages).

Young-Yoon Lee, et al., "AHG11: Cross-component prediction based on a neural network model", Joint Video Experts Team (JVET) of ITU-T SG 16 WP 3 and ISO/IEC JTC 1/SC 29, JVET-X0130-v1, Oct. 11-15, 2021, 24th Meeting, by teleconference (5 pages).

Marc Gorriz Blanch, et al., "Chroma Intra Prediction With Attention-Based CNN Architectures", IEEE, ICIP, 2020, pp. 783-787 (5 pages).

Yue Li, et al., "A Hybrid Neural Network for Chorma Intra Prediction", IEEE, ICIP, 2018, pp. 1797-1801 (5 pages).

International Search Report dated Oct. 19, 2022 in Application No. PCT/US22/31506.

Written Opinion of the International Searching Authority dated Oct. 19, 2022 in Application No. PCT/US22/31506.

Marc Gorriz Blanch et al., "Attention-Based Neural Networks for Chroma Intra Prediction in Video Coding", Journal of Selected Topics in Signal Processing, Oct. 2020, pp. 1-12 (12 pages total).

Linwei Zhu, et al., "Deep Learning-Based Chroma Prediction for Intra Versatile Video Coding", IEEE Transactions on Circuits and Systems for Video Technology, Aug. 2021, vol. 31, No. 8, pp. 3168-3181 (14 pages).

K. Zhang, J. Chen, L. Zhang, X. Li and M. Karczewicz, "Enhanced Cross-Component Linear Model for Chroma Intra-Prediction in Video Coding," in IEEE Transactions on Image Processing, vol. 27, No. 8, pp. 3983-3997, Aug. 2018, doi: 10.1109/TIP.2018.2830640. (Year: 2018).

\* cited by examiner

FIG. 6    600

DNN-BASED CROSS COMPONENT PREDICTION

CROSS-REFERENCE TO RELATED APPLICATION

This application is a continuation of U.S. application Ser. No. 17/749,730, filed May 20, 2022, which claims priority from U.S. Provisional Application No. 63/210,741, filed on Jun. 15, 2021, the disclosure of which is incorporated herein by reference in its entirety.

FIELD

Embodiments of the present disclosure are directed to methods and systems of DNN-based cross component prediction.

BACKGROUND

Traditional video coding standards, such as the H.264/Advanced Video Coding (H.264/AVC), High-Efficiency Video Coding (HEVC), and Versatile Video Coding (VVC) are designed on a similar (recursive) block-based hybrid prediction/transform framework where individual coding tools like intra/inter prediction, integer transforms, and context-adaptive entropy coding, are intensively hand-crafted to optimize the overall efficiency. Basically, the spatiotemporal pixel neighborhoods are leveraged for predictive signal construction, to obtain corresponding residuals for subsequent transform, quantization, and entropy coding. On the other hand, the nature of Deep Neural Networks (DNN) is to extract different levels of spatiotemporal stimuli by analyzing spatiotemporal information from the receptive field of neighboring pixels. The capability of exploring highly nonlinearity and nonlocal spatiotemporal correlations provide promising opportunity for largely improved compression quality.

One purpose of video coding and decoding can be the reduction of redundancy in the input video signal, through compression. Compression can help reducing aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signal is small enough to make the reconstructed signal useful for the intended application. In the case of video, lossy compression is widely employed. The amount of distortion tolerated depends on the application; for example, users of certain consumer streaming applications may tolerate higher distortion than users of television contribution applications. The compression ratio achievable can reflect that: higher allowable/tolerable distortion can yield higher compression ratios.

SUMMARY

Leveraging information from different components and other side information, a traditional encoder can predict other components to achieve better compression performance. However, cross component linear prediction mode in intra-prediction cannot work well compared with a DNN-based method. The nature of DNN is to extract different high level of stimuli and the capability of exploring highly nonlinearity and nonlocal correlations provides promising opportunity for high compression quality. Embodiments of the present disclosure use a DNN-based model to handle an arbitrary shape of luma component, reference components, and side information to predict a reconstructed chroma component to achieve better compression performance.

Embodiments of the present disclosure provide a Cross Component Prediction (CCP) model as a new mode in intra prediction by using a Deep Neural Network (DNN). The model uses the information provided by the encoder, such as the luma component, quantization parameter (QP) value, block depth, etc., to predict chroma component to achieve better compression performance. Previous NN-based intra prediction approaches are either aimed only at the prediction of luma component or generate the prediction for all three channels, disregarding the correlation between chroma component and other additional information.

According to embodiments, a method performed by at least one processor is provided. The method includes: obtaining a reconstructed luma block of an image or video; inputting the reconstructed luma block into a DNN; obtaining reference components and side information associated with the reconstructed luma block; inputting the reference components and the side information into the DNN; and predicting, by the DNN, a reconstructed chroma block of the image or video based on the reconstructed luma block, the reference components, and the side information.

According to embodiments, a system is provided. The system includes: at least one memory configured to store computer program code; and at least one processor configured to access the computer program code and operate as instructed by the computer program code. The compute program code includes: inputting code configured to cause the at least one processor to input a reconstructed luma block of an image or video, reference components, and side information associated with the reconstructed luma block into a deep neural network (DNN) that is implemented by the at least one processor; and predicting code configured to cause the at least one processor to predict, by the DNN, a reconstructed chroma block of the image or video based on the reconstructed luma block, the reference components, and the side information that are input.

According to embodiments, a non-transitory computer-readable medium storing computer code is provided. The computer code is configured to, when executed by at least one processor, cause the at least one processor to: implement a DNN; input a reconstructed luma block of an image or video, reference components, and side information associated with the reconstructed luma block into the DNN; and predict, by the DNN, a reconstructed chroma block of the image or video based on the reconstructed luma block, the reference components, and the side information that are input.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

Figure 1:
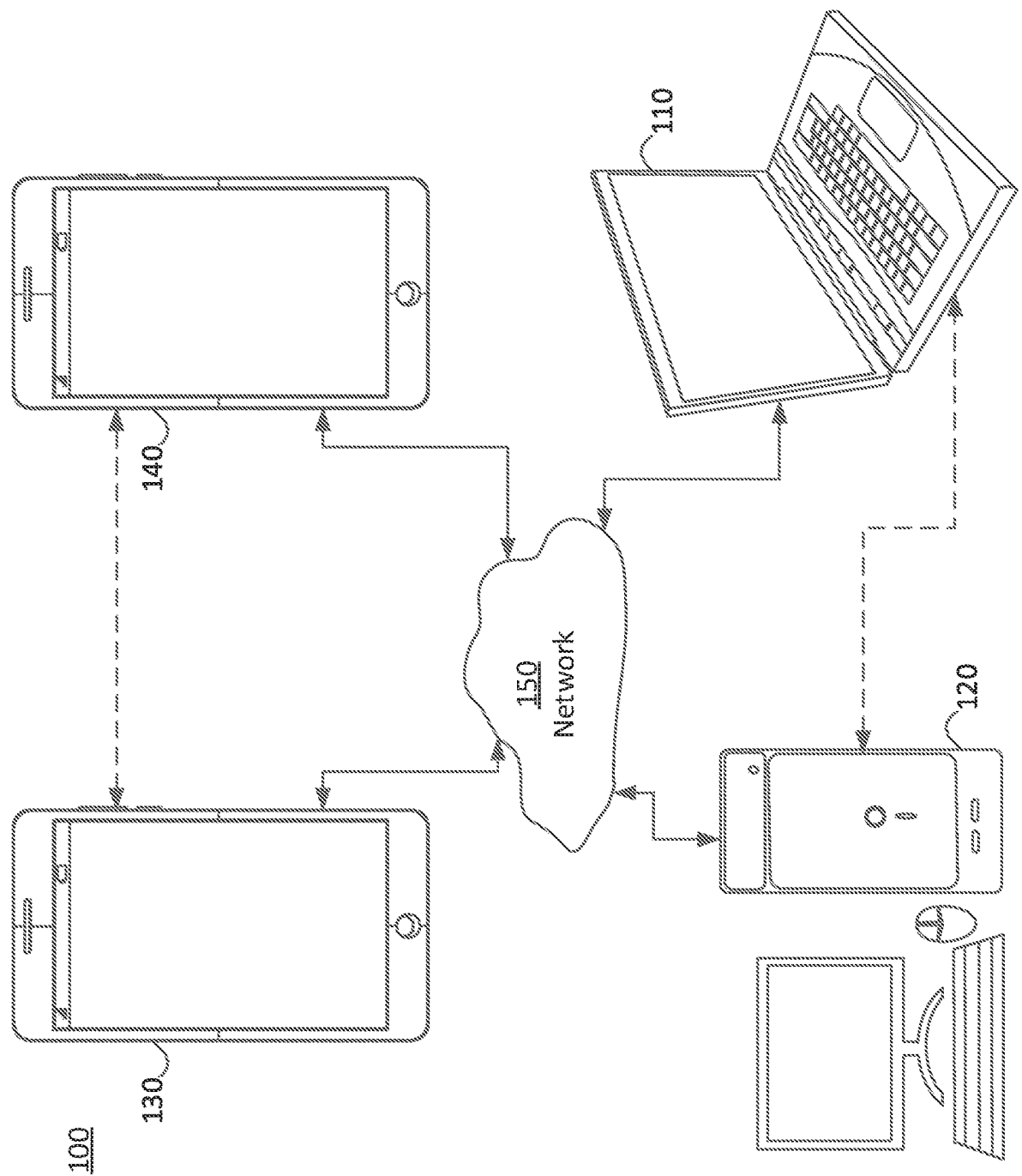
FIG. 1 is a schematic illustration of a simplified block diagram of a communication system in accordance with an embodiment.

FIG. 1 illustrates a simplified block diagram of a communication system 100 according to an embodiment of the present disclosure. The communication system 100 may include at least two terminals 110, 120 interconnected via a network 150. For unidirectional transmission of data, a first terminal 110 may code video data at a local location for transmission to the other terminal 120 via the network 150. The second terminal 120 may receive the coded video data of the other terminal from the network 150, decode the coded data and display the recovered video data. Unidirectional data transmission may be common in media serving applications and the like.

FIG. 1 illustrates a second pair of terminals 130, 140 provided to support bidirectional transmission of coded video that may occur, for example, during videoconferencing. For bidirectional transmission of data, each terminal 130, 140 may code video data captured at a local location for transmission to the other terminal via the network 150. Each terminal 130, 140 also may receive the coded video data transmitted by the other terminal, may decode the coded data, and may display the recovered video data at a local display device.

In FIG. 1, the terminals 110-140 may be illustrated as servers, personal computers, and smart phones, and/or any other type of terminal. For example, the terminals 110-140 may be laptop computers, tablet computers, media players and/or dedicated video conferencing equipment. The network 150 represents any number of networks that convey coded video data among the terminals 110-140, including for example wireline and/or wireless communication networks. The communication network 150 may exchange data in circuit-switched and/or packet-switched channels. Representative networks include telecommunications networks, local area networks, wide area networks, and/or the Internet. For the purposes of the present discussion, the architecture and topology of the network 150 may be immaterial to the operation of the present disclosure unless explained herein below.

Figure 2:
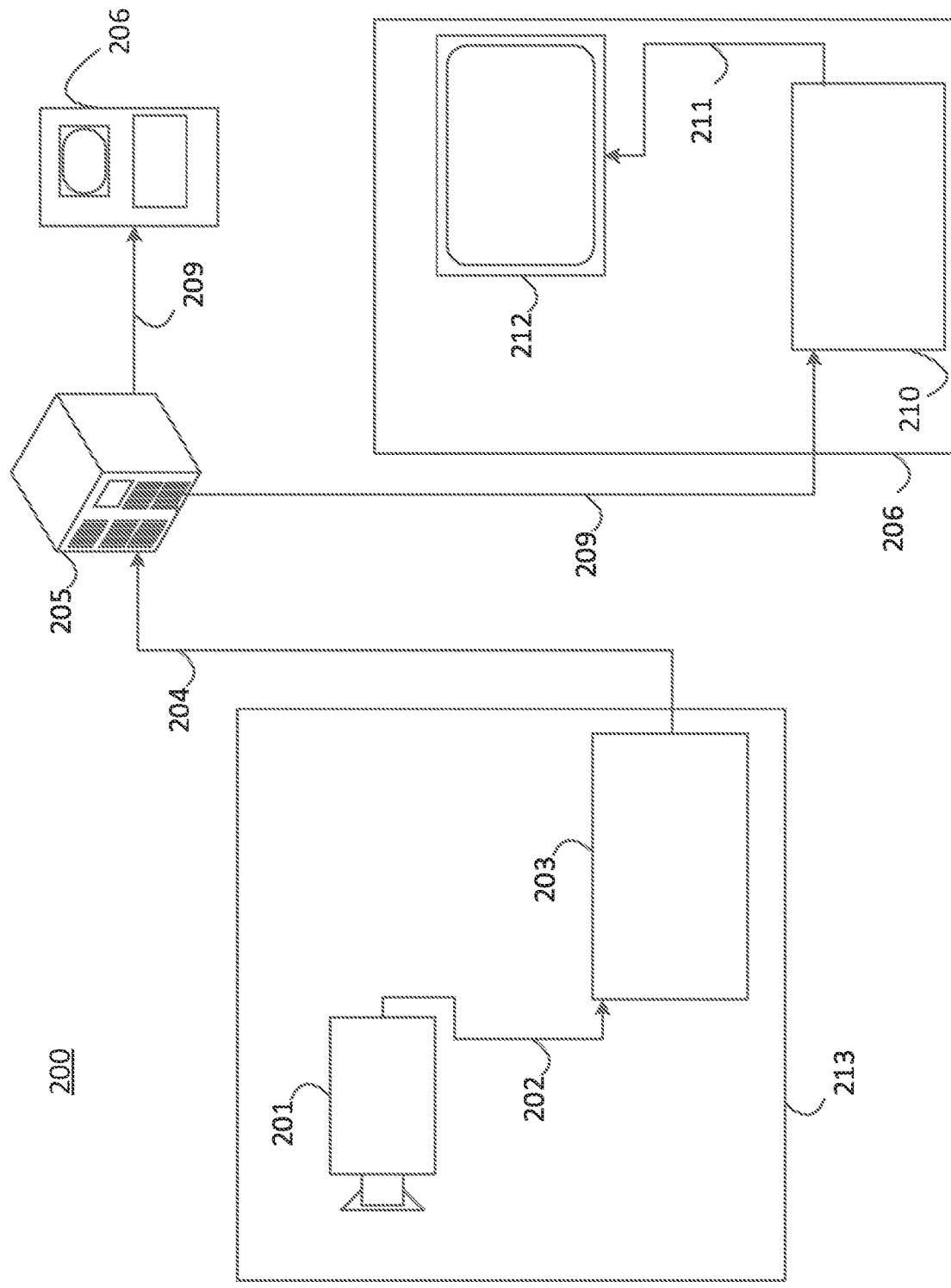
FIG. 2 is a schematic illustration of a simplified block diagram of a communication system in accordance with an embodiment.

FIG. 2 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

As illustrated in FIG. 2, a streaming system 200 may include a capture subsystem 213 that can include a video source 201 and an encoder 203. The video source 201 may be, for example, a digital camera, and may be configured to create an uncompressed video sample stream 202. The uncompressed video sample stream 202 may provide a high data volume when compared to encoded video bitstreams, and can be processed by the encoder 203 coupled to the video source 201. The encoder 203 can include hardware, software, or a combination thereof to enable or implement aspects of the disclosed subject matter as described in more detail below. The encoded video bitstream 204 may include a lower data volume when compared to the sample stream, and can be stored on a streaming server 205 for future use. One or more streaming clients 206 can access the streaming server 205 to retrieve video bitstreams 209 that may be copies of the encoded video bitstream 204.

In embodiments, the streaming server 205 may also function as a Media-Aware Network Element (MANE). For example, the streaming server 205 may be configured to prune the encoded video bitstream 204 for tailoring potentially different bitstreams to one or more of the streaming clients 206. In embodiments, a MANE may be separately provided from the streaming server 205 in the streaming system 200.

The streaming clients 206 can include a video decoder 210 and a display 212. The video decoder 210 can, for example, decode video bitstream 209, which is an incoming copy of the encoded video bitstream 204, and create an outgoing video sample stream 211 that can be rendered on the display 212 or another rendering device (not depicted). In some streaming systems, the video bitstreams 204, 209 can be encoded according to certain video coding/compression standards. Examples of such standards include, but are not limited to, ITU-T Recommendation H.265. Under development is a video coding standard informally known as Versatile Video Coding (VVC). Embodiments of the disclosure may be used in the context of VVC.

Figure 3:
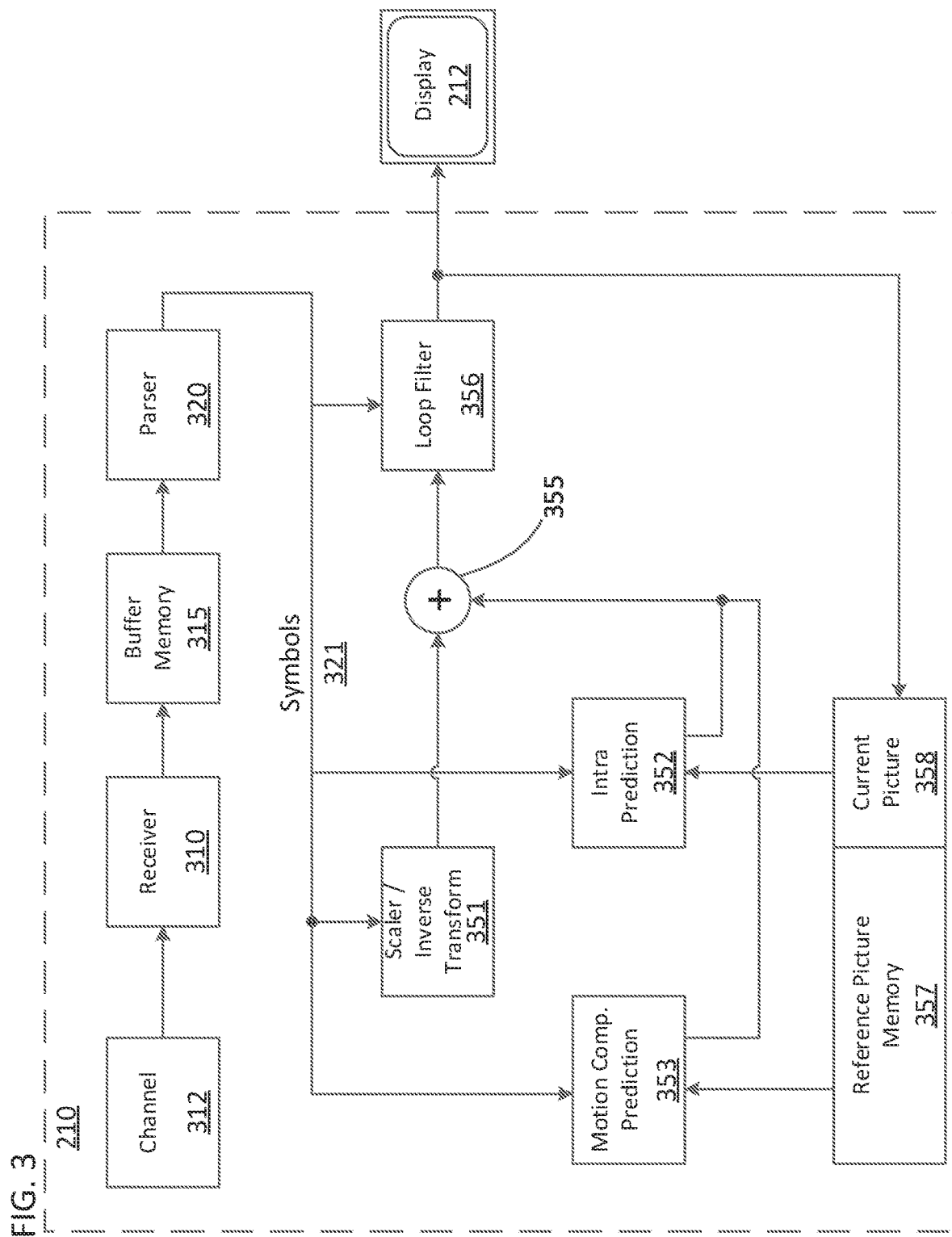
FIG. 3 is a schematic illustration of a simplified block diagram of a decoder in accordance with an embodiment.

FIG. 3 illustrates an example functional block diagram of a video decoder 210 that is attached to a display 212 according to an embodiment of the present disclosure.

The video decoder 210 may include a channel 312, receiver 310, a buffer memory 315, an entropy decoder/parser 320, a scaler/inverse transform unit 351, an intra picture prediction unit 352, a Motion Compensation Prediction unit 353, an aggregator 355, a loop filter unit 356, reference picture memory 357, and current picture memory. In at least one embodiment, the video decoder 210 may include an integrated circuit, a series of integrated circuits, and/or other electronic circuitry. The video decoder 210 may also be partially or entirely embodied in software running on one or more CPUs with associated memories.

In this embodiment, and other embodiments, the receiver 310 may receive one or more coded video sequences to be decoded by the decoder 210 one coded video sequence at a time, where the decoding of each coded video sequence is independent from other coded video sequences. The coded video sequence may be received from the channel 312, which may be a hardware/software link to a storage device which stores the encoded video data. The receiver 310 may receive the encoded video data with other data, for example, coded audio data and/or ancillary data streams, that may be forwarded to their respective using entities (not depicted). The receiver 310 may separate the coded video sequence from the other data. To combat network jitter, the buffer memory 315 may be coupled in between the receiver 310 and the entropy decoder/parser 320 ("parser" henceforth). When the receiver 310 is receiving data from a store/forward device of sufficient bandwidth and controllability, or from an isosynchronous network, the buffer memory 315 may not be used, or can be small. For use on best effort packet networks such as the Internet, the buffer memory 315 may be required, can be comparatively large, and can be of adaptive size.

The video decoder 210 may include a parser 320 to reconstruct symbols 321 from the entropy coded video sequence. Categories of those symbols include, for example, information used to manage operation of the decoder 210, and potentially information to control a rendering device such as a display 212 that may be coupled to a decoder as illustrated in FIG. 2. The control information for the rendering device(s) may be in the form of, for example, Supplementary Enhancement Information (SEI) messages or Video Usability Information (VUI) parameter set fragments (not depicted). The parser 320 may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser 320 may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 320 may also extract from the coded video sequence information such as transform coefficients, quantizer parameter values, motion vectors, and so forth.

The parser 320 may perform entropy decoding/parsing operation on the video sequence received from the buffer memory 315, so to create symbols 321.

Reconstruction of the symbols 321 can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser 320. The flow of such subgroup control information between the parser 320 and the multiple units below is not depicted for clarity.

Beyond the functional blocks already mentioned, decoder 210 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

One unit may be the scaler/inverse transform unit 351. The scaler/inverse transform unit 351 may receive quantized transform coefficient as well as control information, including which transform to use, block size, quantization factor, quantization scaling matrices, etc. as symbol(s) 321 from the parser 320. The scaler/inverse transform unit 351 can output blocks including sample values that can be input into the aggregator 355.

In some cases, the output samples of the scaler/inverse transform unit 351 can pertain to an intra coded block; that is: a block that is not using predictive information from previously reconstructed pictures, but can use predictive information from previously reconstructed parts of the current picture. Such predictive information can be provided by an intra picture prediction unit 352. In some cases, the intra picture prediction unit 352 generates a block of the same size and shape of the block under reconstruction, using surrounding already reconstructed information fetched from the current (partly reconstructed) picture from the current picture memory 358. The aggregator 355, in some cases, adds, on a per sample basis, the prediction information the intra picture prediction unit 352 has generated to the output sample information as provided by the scaler/inverse transform unit 351.

In other cases, the output samples of the scaler/inverse transform unit 351 can pertain to an inter coded, and potentially motion compensated block. In such a case, a Motion Compensation Prediction unit 353 can access reference picture memory 357 to fetch samples used for prediction. After motion compensating the fetched samples in accordance with the symbols 321 pertaining to the block, these samples can be added by the aggregator 355 to the output of the scaler/inverse transform unit 351 (in this case called the residual samples or residual signal) so to generate output sample information. The addresses within the reference picture memory 357, from which the Motion Compensation Prediction unit 353 fetches prediction samples, can be controlled by motion vectors. The motion vectors may be available to the Motion Compensation Prediction unit 353 in the form of symbols 321 that can have, for example, X, Y, and reference picture components. Motion compensation also can include interpolation of sample values as fetched from the reference picture memory 357 when sub-sample exact motion vectors are in use, motion vector prediction mechanisms, and so forth.

The output samples of the aggregator 355 can be subject to various loop filtering techniques in the loop filter unit 356. Video compression technologies can include in-loop filter technologies that are controlled by parameters included in the coded video bitstream and made available to the loop filter unit 356 as symbols 321 from the parser 320, but can also be responsive to meta-information obtained during the decoding of previous (in decoding order) parts of the coded picture or coded video sequence, as well as responsive to previously reconstructed and loop-filtered sample values.

The output of the loop filter unit 356 can be a sample stream that can be output to a render device such as a display 212, as well as stored in the reference picture memory 357 for use in future inter-picture prediction.

Certain coded pictures, once fully reconstructed, can be used as reference pictures for future prediction. Once a coded picture is fully reconstructed and the coded picture has been identified as a reference picture (by, for example, parser 320), the current reference picture can become part of the reference picture memory 357, and a fresh current picture memory can be reallocated before commencing the reconstruction of the following coded picture.

The video decoder 210 may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver 310 may receive additional (redundant) data with the encoded video. The additional data may be included as part of the coded video sequence(s). The additional data may be used by the video decoder 210 to properly decode the data and/or to more accurately reconstruct the original video data. Additional data can be in the form of, for example, temporal, spatial, or SNR enhancement layers, redundant slices, redundant pictures, forward error correction codes, and so on.

Figure 4:
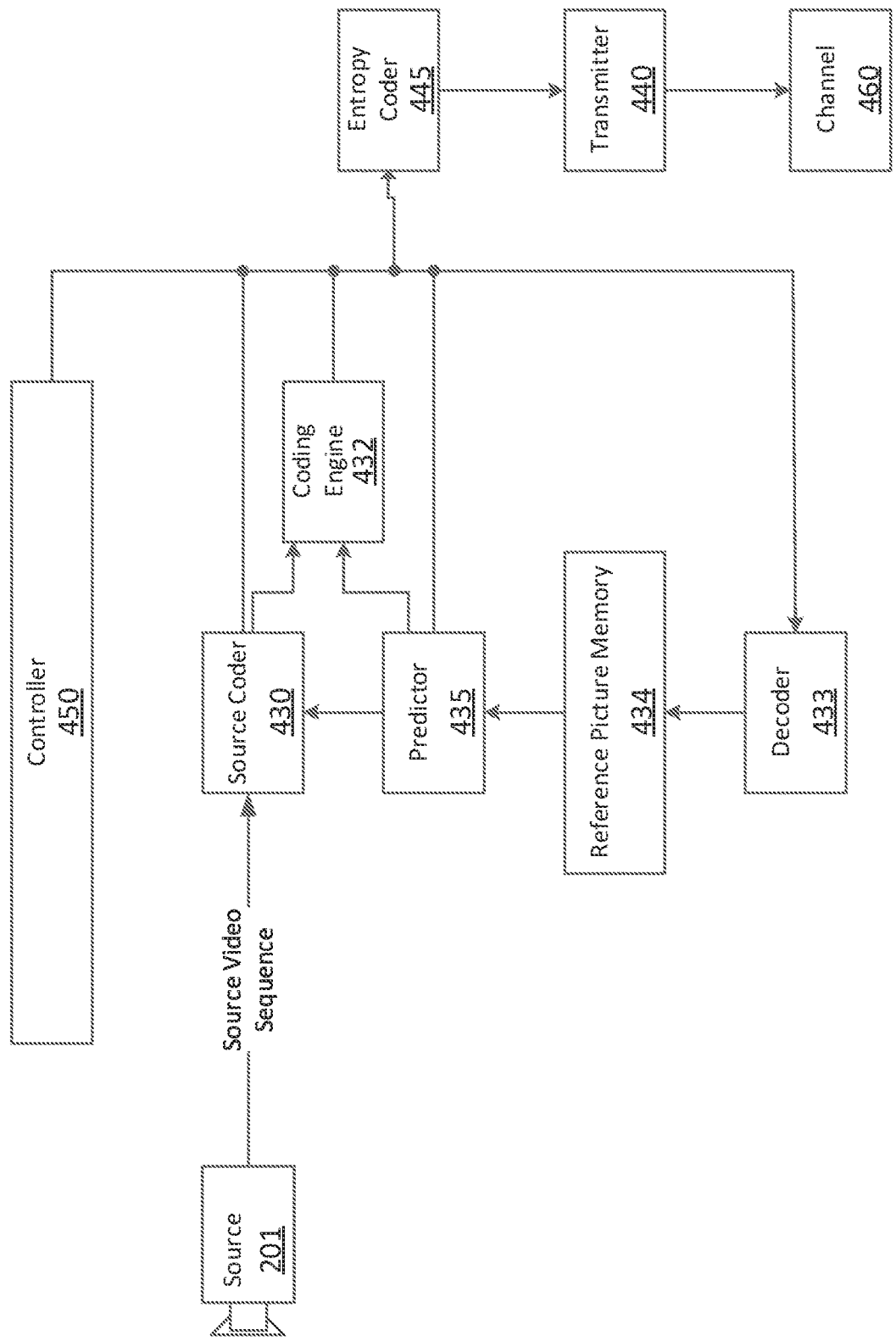
FIG. 4 is a schematic illustration of a simplified block diagram of an encoder in accordance with an embodiment.

FIG. 4 illustrates an example functional block diagram of a video encoder 203 associated with a video source 201 according to an embodiment of the present disclosure.

The video encoder 203 may include, for example, an encoder that is a source coder 430, a coding engine 432, a (local) decoder 433, a reference picture memory 434, a predictor 435, a transmitter 440, an entropy coder 445, a controller 450, and a channel 460.

The encoder 203 may receive video samples from a video source 201 (that is not part of the encoder) that may capture video image(s) to be coded by the encoder 203.

The video source 201 may provide the source video sequence to be coded by the encoder 203 in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source 201 may be a storage device storing previously prepared video. In a videoconferencing system, the video source 201 may be a camera that captures local image information as a video sequence. Video data may be provided as a plurality of individual pictures that impart motion when viewed in sequence. The pictures themselves may be organized as a spatial array of pixels, wherein each pixel can include one or more sample depending on the sampling structure, color space, etc. in use. A person skilled in the art can readily understand the relationship between pixels and samples. The description below focuses on samples.

According to an embodiment, the encoder 203 may code and compress the pictures of the source video sequence into a coded video sequence 443 in real time or under any other time constraints as required by the application. Enforcing appropriate coding speed is one function of controller 450. The controller 450 may also control other functional units as described below and may be functionally coupled to these units. The coupling is not depicted for clarity. Parameters set by the controller 450 can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller 450 as they may pertain to video encoder 203 optimized for a certain system design.

Some video encoders operate in what a person skilled in the are readily recognizes as a "coding loop". As an oversimplified description, a coding loop can consist of the encoding part of the source coder 430 (responsible for creating symbols based on an input picture to be coded, and a reference picture(s)), and the (local) decoder 433 embedded in the encoder 203 that reconstructs the symbols to create the sample data that a (remote) decoder also would create when a compression between symbols and coded video bitstream is lossless in certain video compression technologies. That reconstructed sample stream may be input to the reference picture memory 434. As the decoding of a symbol stream leads to bit-exact results independent of decoder location (local or remote), the reference picture memory content is also bit exact between a local encoder and a remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is known to a person skilled in the art.

The operation of the "local" decoder 433 can be the same as of a "remote" decoder 210, which has already been described in detail above in conjunction with FIG. 3. However, as symbols are available and en/decoding of symbols to a coded video sequence by the entropy coder 445 and the parser 320 can be lossless, the entropy decoding parts of decoder 210, including channel 312, receiver 310, buffer memory 315, and parser 320 may not be fully implemented in the local decoder 433.

An observation that can be made at this point is that any decoder technology, except the parsing/entropy decoding that is present in a decoder, may need to be present, in substantially identical functional form in a corresponding encoder. For this reason, the disclosed subject matter focuses on decoder operation. The description of encoder technologies can be abbreviated as they may be the inverse of the comprehensively described decoder technologies. Only in certain areas a more detail description is required and provided below.

As part of its operation, the source coder 430 may perform motion compensated predictive coding, which codes an input frame predictively with reference to one or more previously-coded frames from the video sequence that were designated as "reference frames." In this manner, the coding engine 432 codes differences between pixel blocks of an input frame and pixel blocks of reference frame(s) that may be selected as prediction reference(s) to the input frame.

The local decoder 433 may decode coded video data of frames that may be designated as reference frames, based on symbols created by the source coder 430. Operations of the coding engine 432 may advantageously be lossy processes. When the coded video data may be decoded at a video decoder (not shown in FIG. 4), the reconstructed video sequence typically may be a replica of the source video sequence with some errors. The local decoder 433 replicates decoding processes that may be performed by the video decoder on reference frames and may cause reconstructed reference frames to be stored in the reference picture memory 434. In this manner, the encoder 203 may store copies of reconstructed reference frames locally that have common content as the reconstructed reference frames that will be obtained by a far-end video decoder (absent transmission errors).

The predictor 435 may perform prediction searches for the coding engine 432. That is, for a new frame to be coded, the predictor 435 may search the reference picture memory 434 for sample data (as candidate reference pixel blocks) or certain metadata such as reference picture motion vectors, block shapes, and so on, that may serve as an appropriate prediction reference for the new pictures. The predictor 435 may operate on a sample block-by-pixel block basis to find appropriate prediction references. In some cases, as determined by search results obtained by the predictor 435, an input picture may have prediction references drawn from multiple reference pictures stored in the reference picture memory 434.

The controller 450 may manage coding operations of the source coder 430, including, for example, setting of parameters and subgroup parameters used for encoding the video data.

Output of all aforementioned functional units may be subjected to entropy coding in the entropy coder 445. The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter 440 may buffer the coded video sequence(s) as created by the entropy coder 445 to prepare it for transmission via a communication channel 460, which may be a hardware/software link to a storage device which would store the encoded video data. The transmitter 440 may merge coded video data from the source coder 430 with other data to be transmitted, for example, coded audio data and/or ancillary data streams (sources not shown).

The controller 450 may manage operation of the encoder 203. During coding, the controller 450 may assign to each coded picture a certain coded picture type, which may affect the coding techniques that may be applied to the respective picture. For example, pictures often may be assigned as an Intra Picture (I picture), a Predictive Picture (P picture), or a Bi-directionally Predictive Picture (B Picture).

An Intra Picture (I picture) may be one that may be coded and decoded without using any other frame in the sequence as a source of prediction. Some video codecs allow for different types of Intra pictures, including, for example Independent Decoder Refresh (IDR) Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video encoder 203 may perform coding operations according to a predetermined video coding technology or standard, such as ITU-T Rec. H.265. In its operation, the video encoder 203 may perform various compression operations, including predictive coding operations that exploit temporal and spatial redundancies in the input video sequence. The coded video data, therefore, may conform to a syntax specified by the video coding technology or standard being used.

In an embodiment, the transmitter 440 may transmit additional data with the encoded video. The source coder 430 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

Embodiments of the present disclosure provide DNN-based cross component prediction. Examples embodiments are described below with reference to FIGS. 5-6.

A video compression framework, according to embodiments of the present disclosure, is described as follows. Assume an input video includes a plurality of image frames equal to a total number of frames in a video. The frames are partitioned into spatial blocks, each block can be partitioned into smaller blocks iteratively. The block contains both a luma component 510y and a chroma component 520 that includes chroma channels 520u and 520t. During an intra-prediction process, the luma component 510y can be predicted first, and then the two chroma channels 520u and 520t can be predicted later. The prediction of both chroma channels 520u and 520t can be performed jointly or separately.

In an embodiment of the present disclosure, the reconstructed chroma component 520 is generated by DNN-based models in both an encoder and a decoder, or only in the decoder. The two chroma channels 520u and 520t may be generated together with a single network, or separately with different networks. For each chroma channel, the chroma channel may be generated using a different network based on the block size. One or more processes including signal-processing, spatial or temporal filtering, scaling, weighted averaging, up-/down-sampling, pooling, recursive processing with memory, linear system processing, non-linear system processing, neural-network processing, deep-learning based processing, AI-processing, pre-trained network processing, machine-learning based processing, or their combinations can be used as modules in embodiments of the present disclosure in the DNN-based cross component prediction. For processing the reconstructed chroma component 520, one reconstructed chroma channel (e.g., one from among the chroma channels 520u and 520t) can be used to generate the other reconstructed chroma channel (e.g., the other from among the chroma channels 520u and 520t).

According to embodiments of the present disclosure, a DNN-based Cross Component Prediction model may be provided that enhances the compression performance of reconstructed chroma channels 520u and 520t of a block, based on a reconstructed luma component 510y of the block, reference components, and other side information provided by the encoder. According to embodiments, 4:2:0 may be used for subsampling the chroma channels 520u and 520t. Therefore, the chroma channels 520u and 520t may have a lower resolution than the luma component 510y.

Figure 5:
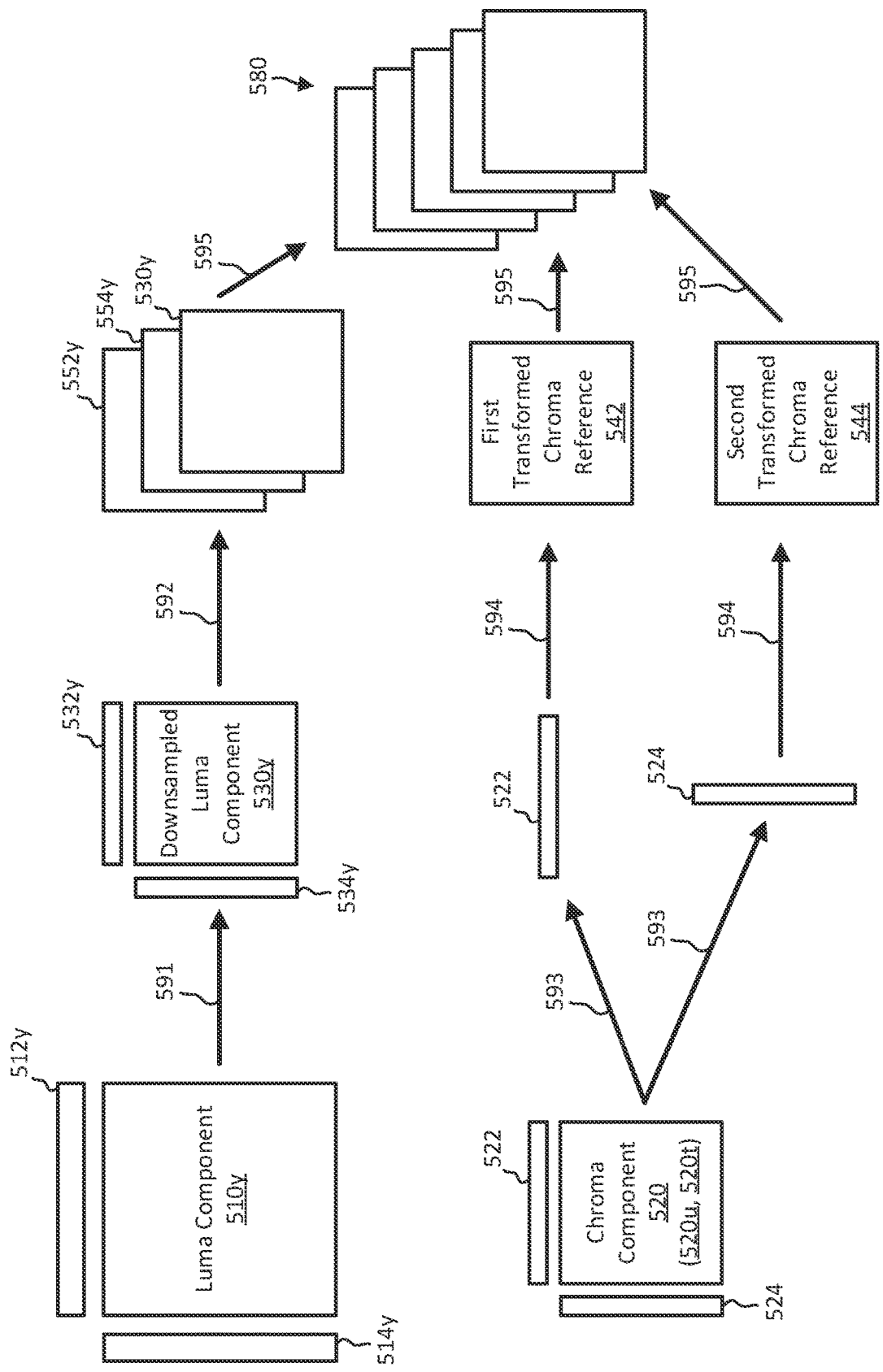
FIG. 5 is a schematic illustration of a simplified block diagram of a process of input generation in accordance with an embodiment.

With reference to FIG. 5, a process 500 is described below. The process 500 includes a workflow of generating input samples 580 for training and/or prediction in a general hybrid video coding system according to embodiments of the present disclosure.

The reconstructed luma component 510y may be a luma block that is a 2N×2M block, wherein 2N is the width of the luma block and 2M is the height of the luma block. According to embodiments, a first luma reference 512y that is a 2N×2K block, and a second luma reference 514y that is 2K×2M block may also be provided, wherein 2K stands for the number of rows or columns in the luma references. To make the luma size the same as a predicted output size, a downsampling process 591 is applied for the luma component 510y, the first luma reference 512y, and the second luma reference 514y. The downsampling process 530 can be a traditional method such as bicubic and bilinear, or it can be NN-based downsampling method. After the downsampling, the luma component 510y may become a downsampled luma component 530y having a block size of N×M, the first luma reference 512y may become a downsampled first luma reference 532y having a block size of N×K, and the second luma reference 514y may become a downsampled second luma reference 534y having a block size of K×M. The downsampled first luma reference 532y and the downsampled second luma reference 534y may be transformed (at step 592) to become a first transformed luma reference 552y and a second transformed luma reference 554y, respectively, that match the size of the downsampled luma component 530y (also referred to as a luma block), and the first transformed luma reference 552y, the second transformed luma reference 554y, and the downsampled luma component 530y may be concatenated (at step 592) together. For example, the transformation can be performed by duplicating the value of the downsampled first luma reference 532y and the downsampled second luma reference 534y several times until the size thereof are the same as an output block size (e.g., the size of the downsampled luma component 530y).

To predict the chroma component 520, adjacent references (e.g., a first chroma reference 522 and a second chroma reference 524) of the chroma component 520 can also be added as an optional reference for generating a better chroma component. With reference to FIG. 5, the chroma component 520 may be a block having a size N×M, which is the reconstructed chroma block that may be generated/predicted in embodiments of the present disclosure. The chroma component 520 has two chroma channels 520u and 520t, and both channels 520u and 520t may be used jointly. The first chroma reference 522 and the second chroma reference 524 may be obtained (at step 593), which may have a block size of N×K and K×M, respectively. According to embodiments, the first chroma reference 522 and the second chroma reference 524 may each be obtained twice to correspond to the two chroma channels 520u and 520t. The first chroma reference 522 and the second chroma reference 524 may be transformed (at step 594) to a first transformed chroma reference 542 and a second transformed chroma reference 544, respectively, that match the size of N×M. All image-based information (e.g., the downsampled luma component 530y, the first transformed luma reference 552y, the second transformed luma reference 554y, the first transformed chroma reference 542, and the second transformed chroma reference 544) can be concatenated (at step 595) together to obtain input samples 580 for training the DNN and/or for prediction using the DNN. Beside the luma and chroma component, side information can be added to the input for training the neural network and/or prediction. For example, a QP value and block partition depth information can be used to generate a feature map that has the size N×M, and can be concatenated together (at step 595) with image-based feature maps (e.g., the downsampled luma component 530y, the first transformed luma reference 552y, the second transformed luma reference 554y, the first transformed chroma reference 542, and the second transformed chroma reference 544) to generate the input samples 580 for training and/or prediction.

A workflow of a process 600 in a general hybrid video coding system is described below with reference to FIG. 6.

A set of a reconstructed luma block 610 (also referred to as a luma component), side information 612, adjacent luma references 614 to the luma block 610, and adjacent chroma references 616 to the chroma block to be reconstructed, may be used as the input of a DNN 620, so that a model of embodiments of the present disclosure can perform both training and predicting. The output 630 of the DNN 620 may be a predicted chroma component, and two chroma channels may be predicted using different DNN models or the same DNN model.

According to embodiments, the inputs to the DNN 620 may be the input samples 580 described with reference to FIG. 5. For example, the reconstructed luma block 610 may be the downsampled luma component 530y, the adjacent luma references 614 may be one or more of the first transformed luma reference 552y and the second transformed luma reference 554y, and the adjacent chroma references 616 may be one or more of first transformed chroma reference 542 and the second transformed chroma reference 544 (for one or both of the chroma channels 520u and 520t). According to embodiments, the side information may include, for example, the QP value and block partition depth information.

The combination, the concatenation, or the order of how the reconstructed luma block 610, the side information 612, the adjacent luma references 614, and the adjacent chroma references 616 are used as the input can be changed variously. According to embodiments, the side information 612, the adjacent luma references 614, and/or the adjacent chroma references 616 may be optional inputs for the DNN 620, based on a decision(s) by the coding systems of embodiments of the present disclosure.

According to embodiments, coding systems of the present disclosure may compute reconstruction quality (step 640) by, for example, comparing the output 630 of the DNN 620 (e.g., the predicted chroma component) with the original chroma block 660, and by comparing one or more chroma blocks from other predication modes (step 650) with the original chroma block 660. Based on determining one from among the output 630 (e.g., the predicted chroma component) and the one or more chroma blocks from the other predication modes (step 650) has a highest reconstruction quality (e.g., closest to the original chroma block 660), such block (or mode) may be selected by the coding system to be the reconstructed chroma block 670.

Figure 7:
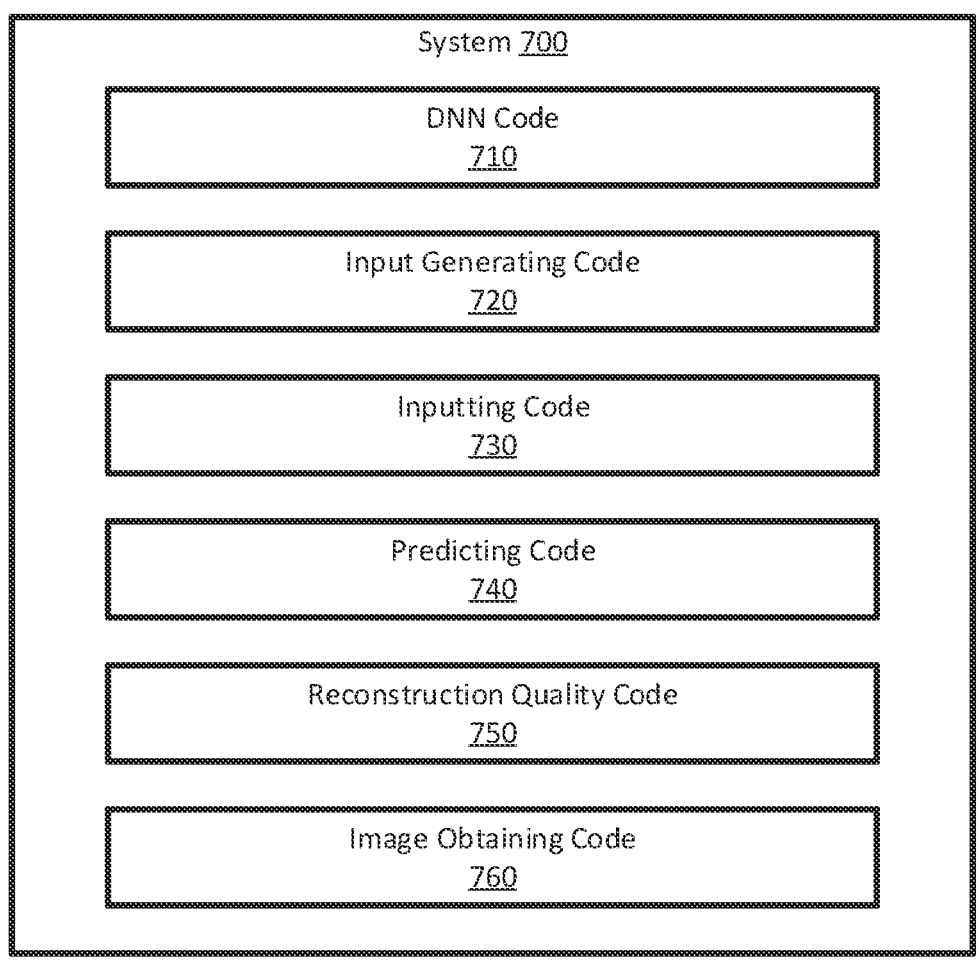
FIG. 7 is a block diagram of computer code according to embodiments.

According to embodiments, at least one processor and memory storing computer program instructions may be provided. The computer program instructions, when executed by the at least one processor, may implement a system that performs any number of the functions described in the present disclosure. For example, with reference to FIG. 7, the at least one processor may implement a system 700. The system 700 may include a DNN(s) and at least one model thereof. The computer program instructions may include, for example, DNN code 710, input generating code 720, inputting code 730, predicting code 740, reconstruction quality code 750, and image obtaining code 760.

The DNN code 710 may be configured to cause the at least one processor to implement the DNN(s) (and models thereof), according to embodiments of the present disclosure.

The input generating code 720 may be configured to cause the at least one processor to generate inputs for the DNN(s), according to embodiments of the present disclosure (e.g., refer to descriptions of FIG. 5). For example, the input generating code 720 may cause the processes described with reference to FIG. 5 to be performed.

Figure 6:
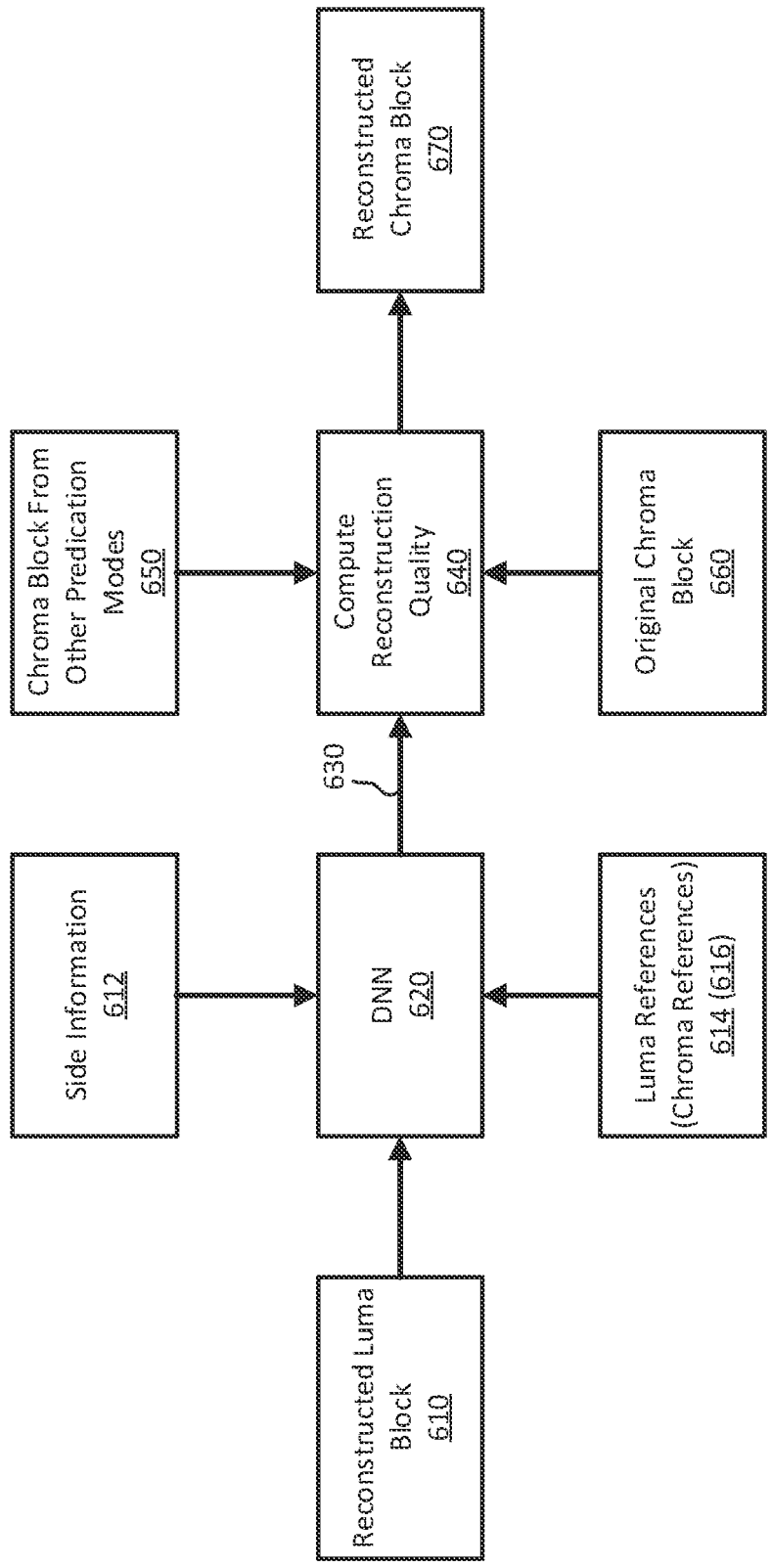
FIG. 6 is a schematic illustration of a simplified block diagram of a process of cross-component prediction in accordance with an embodiment.

The inputting code 730 may be configured to cause the at least one processor to input the inputs into the DNN(s), according to embodiments of the present disclosure (e.g., refer to descriptions of the inputs into DNN 620 illustrated in FIG. 6). For example, with reference to FIG. 6, the inputs may include the reconstructed luma block 610, the side information 612, the luma references 614, and/or the chroma references 616.

The predicting code 740 may be configured to cause the at least one processor to predict, by the DNN(s), a reconstructed chroma block, according to embodiments of the present disclosure (e.g., refer to descriptions of output 630 illustrated in FIG. 6).

The reconstruction quality code 750 may be configured to cause the at least one processor to compute reconstruction qualities of the reconstructed chroma block that is predicted by the DNN, and of another reconstructed chroma block(s) that is predicted using a different predication mode(s), according to embodiments of the present disclosure (e.g., refer to descriptions of steps 640 and 650 illustrated in FIG. 6).

The image obtaining code 760 may be configured to cause the at least one processor to obtain the image using the reconstructed chroma block that is predicted by the DNN, or the another reconstructed chroma block(s) that is predicted using a different predication mode(s), in accordance with embodiments of the present disclosure (e.g., refer to descriptions of step 640 and the reconstructed chroma block 670 illustrated in FIG. 6). For example, the image obtaining code 760 may be configured to cause the at least one processor to select one from among the reconstructed chroma block and the another reconstructed chroma block, based on the one with the highest computed reconstruction quality, and use such reconstructed chroma block to obtain the image. According to embodiments, the image obtaining code 760 may be configured to cause the at least one processor to obtain the image using the reconstructed chroma block that is predicted by the DNN, without reconstruction qualities being computed and/or being used to select between reconstructed chroma blocks. According to embodiments, the reconstructed luma block may also be used to obtain the image.

In comparison with prior cross component prediction methods in intra prediction mode, embodiments of the present disclosure provide a variety of benefits. For example, embodiments of the present disclosure provide a flexible and general framework that accommodates various shapes of reconstructed blocks. Also, embodiments of the present disclosure include an aspect of exploiting the transformation mechanisms with various input information, thereby optimizing the learning ability of DNN models so as to improve coding efficiency. Furthermore, side information may be used with DNN to improve prediction results.

The techniques of embodiments of the present disclosure described above, can be implemented as computer software using computer-readable instructions and physically stored in one or more computer-readable media. For example, FIG. 8 shows a computer system 900 suitable for implementing embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 8:
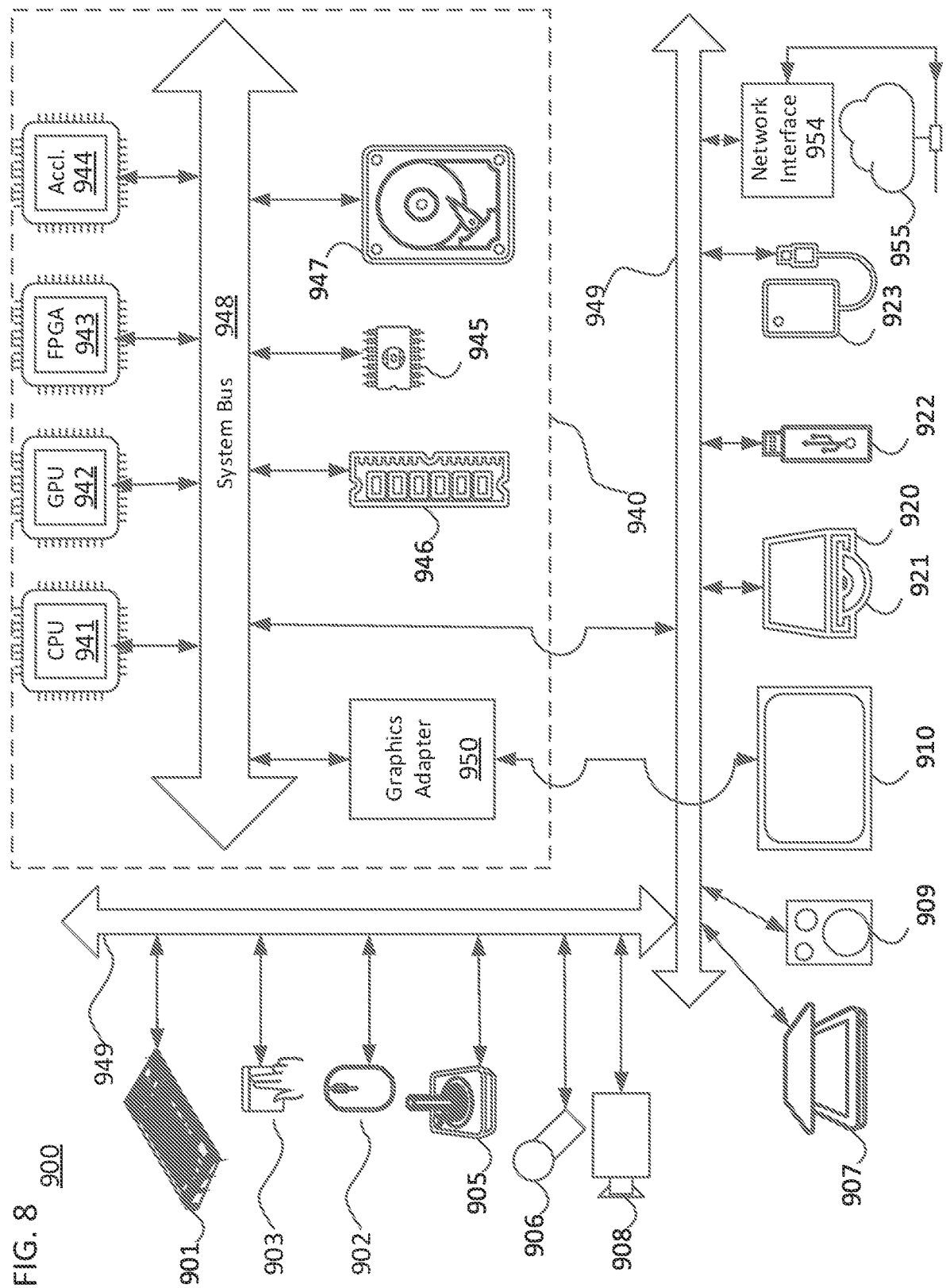
FIG. 8 is a diagram of a computer system suitable for implementing embodiments of the present disclosure.

The components shown in FIG. 8 for computer system 900 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 900.

Computer system 900 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 901, mouse 902, trackpad 903, touch screen 910, data-glove, joystick 905, microphone 906, scanner 907, and camera 908.

Computer system 900 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 910, data-glove, or joystick 905, but there can also be tactile feedback devices that do not serve as input devices). For example, such devices may be audio output devices (such as: speakers 909, headphones (not depicted)), visual output devices (such as screens 910 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 900 can also include human accessible storage devices and their associated media such as optical media including CD/DVD ROM/RW 920 with CD/DVD or the like media 921, thumb-drive 922, removable hard drive or solid state drive 923, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 900 can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses 949 (such as, for example USB ports of the computer system 900; others are commonly integrated into the core of the computer system 900 by attachment to a system bus as described below (for example Ethernet interface into a PC computer system or cellular network interface into a smartphone computer system). Using any of these networks, computer system 900 can communicate with other entities. Such communication can be uni-directional, receive only (for example, broadcast TV), uni-directional send-only (for example CANbus to certain CANbus devices), or bi-directional, for example to other computer systems using local or wide area digital networks. Such communication can include communication to a cloud computing environment 955. Certain protocols and protocol stacks can be used on each of those networks and network interfaces as described above.

Aforementioned human interface devices, human-accessible storage devices, and network interfaces 954 can be attached to a core 940 of the computer system 900.

The core 940 can include one or more Central Processing Units (CPU) 941, Graphics Processing Units (GPU) 942, specialized programmable processing units in the form of Field Programmable Gate Areas (FPGA) 943, hardware accelerators 944 for certain tasks, and so forth. These devices, along with Read-only memory (ROM) 945, Random-access memory 946, internal mass storage such as internal non-user accessible hard drives, SSDs, and the like 947, may be connected through a system bus 948. In some computer systems, the system bus 948 can be accessible in the form of one or more physical plugs to enable extensions by additional CPUs, GPU, and the like. The peripheral devices can be attached either directly to the core's system bus 948, or through a peripheral bus 949. Architectures for a peripheral bus include PCI, USB, and the like. A graphics adapter 950 may be included in the core 940.

CPUs 941, GPUs 942, FPGAs 943, and accelerators 944 can execute certain instructions that, in combination, can make up the aforementioned computer code. That computer code can be stored in ROM 945 or RAM 946. Transitional data can be also be stored in RAM 946, whereas permanent data can be stored for example, in the internal mass storage 947. Fast storage and retrieve to any of the memory devices can be enabled through the use of cache memory, that can be closely associated with one or more CPU 941, GPU 942, mass storage 947, ROM 945, RAM 946, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system 900 having architecture, and specifically the core 940 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 940 that are of non-transitory nature, such as core-internal mass storage 947 or ROM 945. The software implementing various embodiments of the present disclosure can be stored in such devices and executed by core 940. A computer-readable medium can include one or more memory devices or chips, according to particular needs. The software can cause the core 940 and specifically the processors therein (including CPU, GPU, FPGA, and the like) to execute particular processes or particular parts of particular processes described herein, including defining data structures stored in RAM 946 and modifying such data structures according to the processes defined by the software. In addition or as an alternative, the computer system can provide functionality as a result of logic hardwired or otherwise embodied in a circuit (for example: accelerator 944), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several non-limiting example embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method performed by at least one processor, the method comprising:
   obtaining reference components and side information associated with a reconstructed luma block, the side information includes block partition depth information; and
   predicting, by a deep neural network (DNN), a reconstructed chroma block based on the reconstructed luma block, the reference components, and the side information.

2. The method of claim 1, further comprising:
   obtaining the reconstructed luma block, wherein the reconstructed luma block is of an image or video;
   inputting the reconstructed luma block into a deep neural network (DNN); and
   inputting the reference components and the side information into the DNN.

3. The method of claim 1, wherein
   the reference components comprise at least one from among an adjacent luma reference of the reconstructed luma block and an adjacent chroma reference of the reconstructed chroma block, and
   the predicting further comprises predicting, by the DNN, the reconstructed chroma block based on the reconstructed luma block and the least one from among the adjacent luma reference and the adjacent chroma reference that are input.

4. The method of claim 1, wherein
the reference components comprise an adjacent luma reference of the reconstructed luma block and an adjacent chroma reference of the reconstructed chroma block, and
the predicting further comprises predicting, by the DNN, the reconstructed chroma block based on the reconstructed luma block, the adjacent luma reference, and the adjacent chroma reference.

5. The method of claim 1, further comprising generating a feature map based on the side information and concatenating the generated feature map with other image-based feature maps for DNN training.

6. The method of claim 1, wherein the side information includes at least one from among a quantization parameter (QP) value.

7. The method of claim 1, further comprising:
computing reconstruction qualities of the reconstructed chroma block that is predicted by the DNN, and of another reconstructed chroma block that is predicted using a different predication mode; and
obtaining an image or video using one from among the reconstructed chroma block that is predicted by the DNN and the another reconstructed chroma block that is predicted using the different predication mode, based on a highest one from among the reconstruction qualities computed.

8. The method of claim 1, further comprising:
generating inputs of the DNN,
wherein the predicting comprises predicting, by the DNN, the reconstructed chroma block based on the inputs,
wherein the generating comprises:
reconstructing a luma block and obtaining adjacent luma references of the luma block;
downsampling the luma block to obtain the reconstructed luma block as one of the inputs;
downsampling the adjacent luma references of the luma block; and
transforming the adjacent luma references, that are downsampled, to have a same size as the luma block that is downsampled, and
wherein the inputs of the DNN include the luma block that is downsampled and the adjacent luma references that are transformed.

9. The method of claim 8,
wherein the luma block is a 2N by 2M block, and the adjacent luma references comprise a 2N by 2K first luma reference block and a 2K by 2M second luma reference block for reference, wherein N, K, and M are integers, 2N is a width, 2M is a height, 2K is a number of rows or columns in luma reference,
wherein the reconstructed luma block obtained by downsampling the luma block has a size of N×M, and
wherein after downsampling the adjacent luma references, the first luma reference block has a size of N by K, and the second reference luma block has a size of K by M.

10. The method of claim 8, wherein
the generating further comprises transforming adjacent chroma references of the reconstructed chroma block to be predicted to have the same size as the luma block that is downsampled,
wherein the inputs of the DNN include the luma block that is downsampled, the adjacent luma references that are transformed, and the adjacent chroma references that are transformed.

11. A system comprising:
at least one memory configured to store computer program code; and
at least one processor configured to access the computer program code and operate as instructed by the computer program code, the computer program code comprising:
obtaining code configured to cause the at least one processor to obtain reference components and side information associated with a reconstructed luma block, the side information includes block partition depth information; and
predicting code configured to cause the at least one processor to predict, by a deep neural network (DNN) that is implemented by the at least one processor, a reconstructed chroma block based on the reconstructed luma block, the reference components, and the side information that are input.

12. The system of claim 11, wherein
the reference components comprise at least one from among an adjacent luma reference of the reconstructed luma block and an adjacent chroma reference of the reconstructed chroma block, and
the predicting code is further configured to cause the at least one processor to predict, by the DNN, the reconstructed chroma block based on the reconstructed luma block and the least one from among the adjacent luma reference and the adjacent chroma reference.

13. The system of claim 11, wherein
the reference components comprise an adjacent luma reference of the reconstructed luma block and an adjacent chroma reference of the reconstructed chroma block, and
the predicting code is further configured to cause the at least one processor to predict, by the DNN, the reconstructed chroma block based on the reconstructed luma block, the adjacent luma reference, and the adjacent chroma reference.

14. The system of claim 11, wherein the computer program code further comprises input generating code that is configured to cause the at least one processor to generate a feature map based on the side information and concatenate the generated feature map with other image-based feature maps for DNN training.

15. The system of claim 11, wherein the side information comprises a quantization parameter (QP) value.

16. The system of claim 11, wherein the computer program code further comprises:
reconstruction quality code configured to cause the at least one processor to compute reconstruction qualities of the reconstructed chroma block that is predicted by the DNN, and of another reconstructed chroma block that is predicted using a different predication mode; and
image obtaining code configured to cause the at least one processor to obtain by using one from among the reconstructed chroma block that is predicted by the DNN and the another reconstructed chroma block that is predicted using the different predication mode, based on a highest one from among the reconstruction qualities computed.

17. The system of claim 11, wherein the computer program code further comprises:
input generating code configured to cause the at least one processor to generate inputs of the DNN,
wherein the predicting code is further configured to cause the at least one processor to predict, by the DNN, the reconstructed chroma block based on the inputs, wherein the input generating code is configured to cause the at least one processor to generate the inputs of the DNN by causing the at least one processor to:
  reconstruct a luma block and obtaining adjacent luma references of the luma block;
  downsample the luma block to obtain the reconstructed luma block as one of the inputs;
  downsample the adjacent luma references of the luma block; and
  transform the adjacent luma references, that are downsampled, to have a same size as the luma block that is downsampled, and
wherein the inputs of the DNN comprise the luma block that is downsampled and the adjacent luma references that are transformed.

18. The system of claim 17, wherein the luma block is a 2N by 2M block, and the adjacent luma references comprise a 2N by 2K first luma reference block and a 2K by 2M second luma reference block for reference, wherein N, K, and M are integers, 2N is a width, 2M is a height, 2K is a number of rows or columns in luma reference.

19. The system of claim 18, wherein the reconstructed luma block obtained by downsampling the luma block has a size of N×M, and
  after downsampling the adjacent luma references, the first luma reference block has a size of N by K, and the second reference luma block has a size of K by M.

20. A non-transitory computer-readable medium storing computer code that is configured to, when executed by at least one processor, cause the at least one processor to:
  input a reconstructed luma block, obtain reference components and side information associated with a reconstructed luma block, the side information includes block partition depth information; and
  predict, by a deep neural network (DNN), a reconstructed chroma block based on the reconstructed luma block, the reference components, and the side information.

* * * * *